United States Patent Office 2,947,718
Patented Aug. 2, 1960

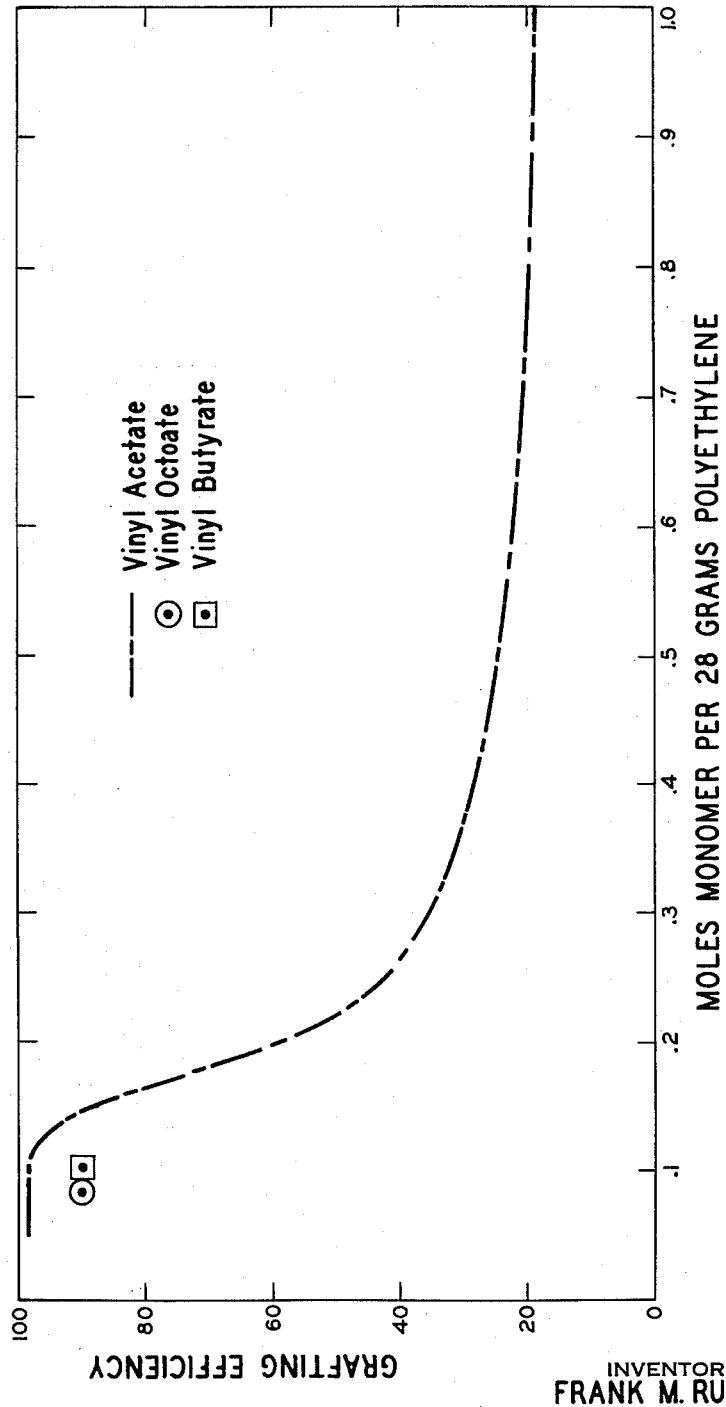

2,947,718

POLYMERIZATION OF VINYL ESTER IN THE PRESENCE OF POLYETHYLENE AND PRODUCT THEREFROM

Frank M. Rugg, West Caldwell, and James E. Potts, Roseland, N.J., assignors to Union Carbide Corporation, a corporation of New York Filed Aug. 30, 1954, Ser. No. 452,808

7 Claims. (Cl. 260—45.5)

This invention relates to novel copolymers as obtained by reacting a polyethylene homopolymer with a polymerizable vinyl ester of an organic acid.

An object of this invention is to provide thermoplastic compositions which are compatible with polyethylene.

Another object of this invention is to provide thermoplastic polyethylene compositions more resistant to heat-distortion than the polyethylene before its reaction with a polymerizable vinyl ester monomer.

A further object of this invention is the production of thermoplastic compositions having more adhesiveness to diverse surfaces such as aluminum, glass and cellophane than is normally had with polyethylene homopolymers.

A still further object of this invention is to obtain thermoplastic compositions characterized by insolubility in solvents which ordinarily dissolve the homopolymers of the monomer employed in reaction with polyethylene.

Still another object is to obtain thermoplastic compositions characterized by improved resistance to environmental stress cracking over that exhibited by polyethylene.

The accomplishment of these and other objects will become apparent as the description of the invention proceeds.

We have found that polyethylene under reaction conditions effective for radical initiated polymerization reacts with those polymerizable vinyl ester monomers which can be homopolymerized by free radical mechanisms to form thermoplastic reaction products hereinafter referred to as graft copolymers of polyethylene. Usually the graft copolymer is present in the reaction product in admixture with some unreacted polyethylene homopolymer. Depending on the specific polymerizable monomer and reaction conditions there may be formed from practically zero to upwards of 20% by weight or more of homopolymers of the polymerizable monomer.

Reaction conditions favorable for radical initiated polymerization include the use of known peroxide or azo catalysts in the reaction mixture of polyethylene and polymerizable monomer.

Suitable polymerizable compounds having a single ethylenic group and which can be reacted with polyethylene to form graft copolymers include vinyl esters such as: Vinyl formate, vinyl acetate, vinyl propionate, vinyl butyrate, vinyl octoate, vinyl stearate, vinyl benzoate and vinyl chloroacetate.

Since some polymerizable monomers are not directly soluble or only poorly soluble in polyethylene homopolymers, particularly those of high molecular weight, e.g. 7,000 and upwards, it has been found desirable to dissolve the polyethylene homopolymer and the polymerizable monomer in a mutual solvent for the polyethylene and the monomer and which is substantially non-reactive to either component. Suitable solvents are aromatic hydrocarbons, as for example benzene, ethyl benzene, cumene, toluene, xylene and chlorinated hydrocarbons, as for example carbon tetrachloride and trichlorobenzene.

Low molecular weight polyethylene homopolymers, as for example grease-like or wax-like polyethylenes having molecular weights of from 500 to 7,000 are often sufficiently soluble, per se in polymerizable monomers such as the vinyl esters of organic acids, e.g. vinyl acetate, vinyl butyrate and the like, as not to require the presence of a mutual solvent to obtain a practical yield of graft copolymer.

Suitable peroxide catalysts include dibenzoyl peroxide (benzoyl peroxide), peracetic acid, hydroxyheptyl peroxide, methyl ethyl ketone peroxide, cyclohexanone peroxide, cumene hydroperoxide, t-butyl hydroperoxide, di-t-butyl diperphthalate, p-chlorobenzoyl peroxide and di-t-butyl peroxide.

While the mechanism of the reaction has not been fully determined, it is believed that in the reaction a certain amount of the polymerizable monomer becomes chemically combined as side chains on a portion of the polyethylene. Also, some of the polymerizable monomer polymerizes to homopolymer. This can be graphically illustrated as follows where P represents an ethylene segment

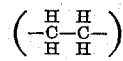

in a polyethylene chain and V represents a segment of a polymerizable monomer, namely vinyl acetate, its segment being

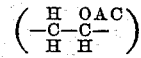

of a polyvinyl acetate chain.

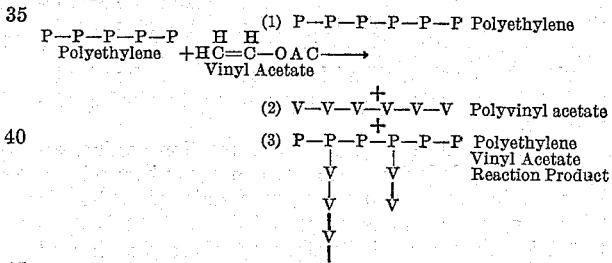

The reaction product of polyethylene and polymerizable monomer is designated as a graft copolymer, this nomenclature arising from the conception that the polymerizable monomer is grafted to the polyethylene in the form of polymeric side chains or branches.

For convenience and clarity, the following nomenclature will be used herein. The numbers in the following parentheses refer to those given in the above paragraph. (1) will be referred to as ethylene homopolymer. (2) will be referred to as vinyl homopolymer. (3) will be referred to as graft copolymer. A mixture of (1), (2) and (3) will be referred to as the gross reaction product. A mixture of (1) and (3) will be referred to as a polyethylene-graft copolymer composition.

The homopolymer of the polymerizable monomer (2) which is usually concurrently formed may be removed from the gross reaction product (3) by solvent extraction procedures, as for example in the instance of graft copolymers based on vinyl acetate by extracting with dimethyl formamide which is a solvent for polyvinyl acetate, but not a solvent for the polyethylene homopolymer (1) and the pure graft copolymer of polyethylene and vinyl acetate (3).

An alternative method is possible when the polyethylene used in the reaction is of comparatively low molecular weight, 500–5000. In this method, hot heptane, which is a non-solvent for vinyl acetate homopolymer but a solvent for ethylene homopolymer and graft polyethylene copolymer, is used as the extraction medium.

Polyethylene homopolymer is usually considered to be incompatible with most other polymeric substances. For example, physical blends of polyethylene with polyvinyl acetate in sheet form (0.010 inch thick) are opaque, blush when stretched or bent, have low tear strength and poor flex life and in other ways exhibit properties generally associated with incompatibility.

A gross reaction product, made by polymerizing vinyl acetate in solution with an equal weight of polyethylene homopolymer, and with a peroxide catalyst in comparable sheet form, is translucent and exhibits improved clarity, tear strength, flex life, shows less tendency to blush when bent or stretched, and in other ways exhibits properties generally associated with improved compatibility over that exhibited by physical blends of comparable proportions of polyethylene and polyvinyl acetate.

When the gross reaction product described in the preceding paragraph is extracted with dimethyl formamide in order to remove polyvinyl acetate homopolymer, the resulting mixture of graft copolymer and polyethylene in comparable sheet form is found to be transparent and to have better tear strength and flex life and does not blush when stretched or bent as compared with physical blends of polyvinyl acetate and polyethylene and the gross reaction product.

These experiments show that a gross reaction product free from vinyl homopolymer, i.e. a mixture of (1) and (3) is more compatible and generally exhibits better mechanical properties than a gross reaction product, i.e. a mixture of (1), (2) and (3), or a physical blend of polyvinyl acetate and polyethylene.

A novel, unexpected feature of this invention is the fact that in the case of the vinyl ester monomers, and under certain reaction conditions to be hereinafter described, it has been found possible to make a gross reaction product containing substantial amounts of graft copolymer and which product is substantially free (<5%) of vinyl homopolymer and hence need not ordinarily be subjected to an extraction step to remove the vinyl homopolymer.

We have found that such a gross reaction product essentially free of vinyl ester homopolymer can be produced by operating at or below a charged ratio of 0.14 mole monomer per 28 grams of polyethylene. This is illustrated in the graph of the drawing where the charged ratios of several vinyl esters, namely vinyl acetate, vinyl octoate and vinyl butyrate to polyethylene are plotted against Efficiency of Grafting. By this latter term is meant that percent by weight of the total polymerized vinyl ester formed in the reaction e.g. homopolymer and graft copolymer which is in grafted form on polyethylene. It is apparent from this curve that the optimum efficiency is obtained when the charged ratio is not greater than about 0.14, and that gross reaction products from reaction mixtures in which the charged ratio of vinyl ester monomer is less than 0.14 mole will be substantially free of vinyl ester homopolymer. This relationship holds regardless of the molecular weight of the polyethylene employed.

The amount of vinyl ester homopolymer formed in the gross reaction product is also determined to some extent by the amount of catalyst added. Thus, a large initial catalyst charge will produce a very rapid reaction rate and the reaction product will contain considerably more of such homopolymer than if carried to the same percent conversion at a slower rate with less catalyst.

This is illustrated by the data given in the following table based on reacting polyethylene of 21,000 molecular weight and vinyl acetate at 80° C., the weight ratio of polyethylene to monomer being 70/30 (equivalent to 0.14 mole of vinyl acetate per 28 grams of polyethylene).

TABLE I

| Percent Benzoyl Peroxide [1] | | Percent Polymerized Vinyl Acetate In Reaction Product [2] | Percent Vinyl Acetate Homopolymer | Vinyl Acetate, Percent Conversion | Reaction Time, Hours |
| --- | --- | --- | --- | --- | --- |
| Start | Total | | | | |
| ½ | 1½ | 14.1 | 1.9 | 38 | 31 |
| 2 | 2 | 13.8 | 1.9 | 34 | 29 |
| 6⅔ | 6⅔ | 16.5 | 4.8 | 43 | 26½ |

[1] Percent benzoyl peroxide on the weight of monomer charged.
[2] Includes total vinyl acetate reacted to homopolymer and reacted with polyethylene to form graft copolymer.

For a given charged ratio of polymerizable monomer to polyethylene it has been found that the grafting efficiency decreases slightly as the percent conversion of monomer to a polymeric form is increased. This is shown by the following table, based on the reaction of vinyl acetate with polyethylene.

| Moles Monomer per 28 gms. PE | Grams Monomer per gm. PE | Percent Conversion of Monomer | Grafting Efficiency of Polymerized Monomer | Percent Polymerized Vinyl Acetate in Gross Reaction Product | | |
| --- | --- | --- | --- | --- | --- | --- |
| | | | | Total | Grafted to Polyethylene | As Homopolymer |
| .604 | 65/35 | 36 | 33 | 40 | 13.2 | 26.8 |
| .604 | 65/35 | 54 | 30 | 50 | 15 | 35 |
| .604 | 65/35 | 88 | 23 | 62 | 14 | 48 |
| .14 | 30/70 | 15 | 99 | 6 | 5.94 | .06 |
| .14 | 30/70 | 36 | 92 | 13.4 | 12.3 | 1.1 |
| .14 | 30/70 | 38 | 96.5 | 14 | 13.5 | 0.5 |
| .14 | 30/70 | 66 | 93 | 22 | 20.5 | 1.5 |

The absence of a pronounced decrease in grafting efficiency makes it possible to increase the actual weight percent of polymerized monomer which is grafted by carrying the reaction to higher conversions. Thus, as illustrated in the above table, using an 0.14 charged mole ratio and carrying the reaction to 15% conversion the grafting efficiency was 99% and resulted in a gross reaction product containing 6% polymerized vinyl acetate, virtually all of which was grafted to polyethylene. Using the same charge, but with the conversion increased to 66%, a gross reaction product containing 22% by weight polymerized vinyl acetate was obtained, all but 1.5% of which was grafted on to polyethylene.

The table also clearly shows the effect of charged monomer-polyethylene ratio on the grafting efficiency. At a charged ratio of 0.14 mole monomer per 28 grams polyethylene the grafting efficiency is above 90% on all reactions from 15% to 66% conversion of monomer. At a charged ratio of 0.6 mole vinyl acetate monomer the grafting efficiency does not rise above 33%.

These data also show that not only is the grafting efficiency higher when a ratio of 0.14 mole vinyl ester is used, but that the actual amount of polymerized monomer which is grafted to polyethylene is greater than when a high charged ratio is used. For example, with the 0.6 mole charge of vinyl acetate per 28 grams polyethylene carried to 88% conversion a gross reaction product resulted containing 62% total polymerized vinyl acetate of which 48 parts were polyvinyl acetate homopolymer and only 14 parts polymerized vinyl acetate grafted to polyethylene. With the 0.14 mole ratio, a gross reaction product containing 22 parts polymerized vinyl acetate was obtained, all but 1.5 parts of which were grafted to polyethylene.

In other words, by using an 0.14 mole ratio a greater amount of grafted polymerized vinyl acetate was obtained with greater grafting efficiency than by using an 0.6 mole ratio.

Separation of the ethylene homopolymer and the graft copolymer is usually difficult due to their similar solubilities and ordinarily is not necessary for uses as a molding material. However, in the instance of reaction products of polyethylene and vinyl esters it is possible to determine the amount of polyethylene homopolymer present by removing the vinyl ester homopolymer, then hydrolyzing the reaction product consisting of ethylene homopolymer and graft copolymer in which case the polymerized vinyl ester branches of the graft copolymer are converted to polymeric vinyl alcohol side chains. Since the hydrolyzed graft copolymer differs in solubility from the polyethylene homopolymer, this enables one to determine the amount of polyethylene homopolymer associated with this graft copolymer. By this procedure, analyses have shown that in the reaction product which is free of vinyl ester homopolymer there is normally about 40% to 60% ethylene homopolymer.

A gross reaction product containing about 60% graft copolymer of vinyl acetate and polyethylene of which 25% by weight is polymerized grafted vinyl acetate, and about 40% polyethylene homopolymer has about the same tensile strength as the polyethylene homopolymer used in the reaction; the impact strength is somewhat higher, whereas the power factor is slightly impaired. Other electrical properties such as dielectric constant, dielectric strength and resistivity are relatively equivalent. The most significant change is in the flow of the material under pressure and heat as determined by the Rossi-Peakes method. This reaction product is stiffer than polyethylene homopolymer and much more form stable as evidenced by resistance to flow at elevated temperatures. This can be illustrated by inserting a wire through one end of bars of the same weight and dimensions made solely of polyethylene homopolymer, and similarly with bars of the gross reaction product, and suspending them in an oven heated to 200° C. The bar of homopolymeric polyethylene will quickly soften and fall from the wire, whereas the bar made from the gross reaction product will remain suspended. The data is given in Table II, which also includes some data of molded bars made from a mechanical mixture of polyethylene and polyvinyl acetate homopolymer.

TABLE II

*Mechanical and electrical properties*

| | Polyethylene | Gross Reaction Product | Mechanical Mix of 86% polyethylene and 14% polyvinyl acetate |
|---|---|---|---|
| Tensile strength, 25° C., p. s. i. | 1,700 | 1,670 | 1,300. |
| Percent Elongation to break | 74 | 47 | 24. |
| Izod Impact—40° C., ft. lbs./in. | 0.38 | 0.51 | 0.38. |
| Power Factor: | | | |
| 60 Cycles | .0003 | .0059 | |
| 10³ Cycles | .0001 | .0040 | |
| 700 kcs | .00012 | .0026 | |
| Dielectric Constant, 60 Cycles 50 mcs. | 2.3 | 2.4 | |
| Dielectric Strength 25° C., Volts per Mil. | 490 | 462 | |
| Resistivity, D.C., Megohm Cm., 23° C. | Over 10⁹ | Over 10⁹ | |
| Rossi Peakes Flow, 1.5″ at 135° C. | 30 Sec. | 41 Sec. | |
| Flex Life (⅛″ thick bar), Cycles. | 100 | 100 | Fails after 5–10 Cycles. |

The size and number of polyvinyl acetate side chains in certain graft copolymers has been estimated to be about 1.5 to 1.7 moles of polyvinyl acetate branches per mole of polyethylene, the average branch having a molecular weight of about 4000. These estimates were based on two reaction products derived from a polyethylene of 12,000 and 21,000 M.W. respectively, the details being given in the following Table III.

TABLE III

| | Reaction Product Based on Polyethylene M.W. 12,000 | Reaction Product Based on Polyethylene M.W. 21,000 |
|---|---|---|
| Percent ethylene homopolymer | 57 | 49 |
| Percent vinyl acetate homopolymer | 1 | 1 |
| Percent graft copolymer | 43 | 51 |
| Polyvinyl acetate: polyethylene ratio in graft polymer | 32/68 | 25/75 |
| Average number of branches per Polyethylene molecule | 1.5 | 1.74 |
| Average M.W. polyvinyl acetate branches | 3,800 | 4,000 |

It is apparent from the above description and from the examples following that a wide range of polymerization products can be prepared according to this invention. The character of the gross reaction product and graft copolymer component can be varied by using polyethylene of different molecular weights, by varying the proportion and types of polymerizable monomer and by varying the conditions of the reaction. For example, it is not necessary that the reaction be carried out in solution. That is particularly true if the lower molecular weight (500–7000 M.W.) polyethylenes are used. The charged ratio of moles of polymerizable vinyl ester monomer to 28 gms. of polyethylene is preferably maintained at about 0.14, which, as stated heretofore, generally gives the optimum grafting efficiency. The amounts of catalyst used is preferably small, and normally need not be more than about 2% based on the weight of polymerizable monomer, although under some conditions it has been found desirable to use up to 20% by weight of catalyst.

The gross reaction products obtained may range from soft to tough, hard materials. Products prepared from low molecular weight polyethylenes are, in general, softer than those prepared from the higher molecular weight polyethylenes. They differ from polyethylene in being more resistant to flow under heat or pressure and in possessing greater adhesiveness when bonded to dissimilar materials such as aluminum or cellophane.

A preferred product is one obtained by reacting polyethylene with vinyl acetate to form a reaction product substantially free of vinyl acetate homopolymer and consisting of about 40% to 60% graft copolymer and 60%–40% polyethylene homopolymer, the polyvinyl acetate-polyethylene weight ratio in the graft polymer being about 25/75 to 30/70. Such a product is capable of being heat-formed into films, threads, tubes, rods, sheets, tapes, ribbons and similar shaped forms, which can be used for waterproofing purposes, electrical insulation and protection from corrosion and chemical attack. The films can be laminated to aluminum foil or to cellophane by heat and pressure. Laminates so prepared resist delamination under flexing and are superior to laminates similarly prepared from unmodified polyethylene.

The invention is further illustrated in the following examples, in which all parts are to be considered as being by weight.

EXAMPLE 1

(A) One hundred parts of polyethylene (M.W. 12,000) were dissolved in 500 parts of boiling benzene and then 200 parts of vinyl acetate added. The solution was refluxed for twenty-four hours with no marked change in viscosity, 10 parts of benzoyl peroxide were added and polymerization then proceeded rapidly for six hours at 80° C. A very viscous solution was poured from the flask and vacuum dried. The poured product (IA) was a white, tough, horny, thermoplastic composition.

(B) A considerable portion of the material stuck to the walls of the flask as a swollen gel. This material was refluxed with boiling N,N-dimethyl formamide for three hours and the resulting slurry centrifuged. A white insoluble precipitate collected at the bottom of the tube. This material was further extracted with a second portion of dimethyl formamide, centrifuged and dried. The dimethyl formamide soluble material was analyzed by infrared spectrophotometric technics and found to be polyvinyl acetate homopolymer. The twice extracted product insoluble in dimethyl formamide (IB) was dried and found to contain about 15% polymerized vinyl acetate chemically combined with polyethylene as a graft copolymer. An 8 mil film of this product (IB) was transparent and flexible and could be creased repeatedly without breaking. On stretching the film no blushing was observed. These properties were quite different than those observed in a film prepared from a mechanical mixture prepared by hot-milling of mixture of 15% polyvinyl acetate and 85% polyethylene. Such a film cracked on creasing and blushed when stretched.

The other portion of the product (product IA) was extracted with dimethyl formamide in a manner described in (B). The dimethyl formamide insoluble product thus obtained after being dried and freed of formamide was found to contain 24% by weight of polymerized vinyl acetate chemically combined with polyethylene as a graft copolymer. An 8 mil film of this material was also markedly superior in compatibility to the film prepared from the mechanical mixture of polyvinyl acetate and polyethylene.

EXAMPLE 2

Twenty-eight grams of polyethylene (M.W. 12,000) were dissolved in 140 grams of benzene and 56 grams of distilled vinyl acetate were then added to the solution dropwise under N₂ atmosphere. 0.28 gram of benzoyl peroxide was added and the system refluxed 6½ hours. On removal of solvent and unreacted monomeric vinyl aectate a white, opaque, brittle thermoplastic material remained. This material by twice extraction with boiling dimethyl formamide (153° C.) followed by centrifugation yielded a copolymer insoluble in dimethyl formamide. An 8 mil film of this insoluble material was quite flexible and more transparent than polyethylene. It did not blush when stretched and could be creased without breaking. Infrared analysis of this film showed that the film contained about 19% polyvinyl acetate chemically combined with polyethylene as a graft copolymer.

EXAMPLE 3

Twenty-six grams of polyethylene (M.W. 21,000) were dissolved in 140 grams benzene and then 52 grams vinyl acetate were added, followed by the addition of 0.26 gram of benzoyl peroxide. The reaction mixture was then refluxed for 25 hours. The resultant gross reaction product was twice extracted with dimethyl formamide to remove polyvinyl acetate homopolymer, and the final dimethyl formamide insoluble material was found to contain about 27% by weight of polymerized vinyl acetate chemically combined with polyethylene. This product in film form was tough and flexible. On stretching it elongated without any noticeable breakdown in elasticity or blushing and broke without turning white at the break.

EXAMPLE 4

Eighty-five grams of polyethylene (M.W. 12,000) were dissolved in 190 grams benzene. 0.15 gram benzoyl peroxide was added and then 15 grams of vinyl acetate. The reaction mixture was refluxed 71 hours in an atmosphere of nitrogen. The benzene was distilled off and the gross reaction product milled on differential rolls at a temperature of about 160° C. The sheeted product was translucent and free from the usual white frosty appearance of mixtures of polyvinyl acetate and polyethylene. A pressed film was almost transparent and could be stretched and creased without blushing. Infrared analysis showed a total content of 9.4% polymerized vinyl acetate as homopolymer and as a component of the graft copolymer. A sample of the material when extracted with boiling dimethyl formamide yielded only 0.55% by weight of extractable material, showing that only a very small amount of vinyl acetate homopolymer had been formed. Ten grams of the product were completely soluble in 90 grams of boiling benzene. On cooling to room temperature, the solution was a soft gel.

EXAMPLE 5

Seventy grams polyethylene (M.W. 21,000) were dissolved in 420 grams boiling benzene, 0.3 gram of benzoyl peroxide was added and then 30 grams of vinyl acetate were added dropwise. The mixture was refluxed 21⅓ hours and an additional 0.15 gram benzoyl peroxide added and reflux continued for 5⅔ hours. The gross reaction product was freed of volatiles by milling it on differential rolls at 150° C. for about 10 minutes. The sheeted material was transparent and very tough. An 8 mil film was flexible and could be creased without blushing. On elongation, the film broke without neckdown and blushing occurred near the break. The material contained 21.8% total polymerized vinyl acetate as determined by infrared analysis. A sample refluxed with dimethyl formamide for four hours at 153° C. showed 1.6% extractibles.

EXAMPLE 6

Two hundred eighty grams polyethylene (M.W. 21,000) were dissolved in 1680 grams boiling benzene and 0.6 gram benzoyl peroxide added. Then 120 grams vinyl acetate monomer were added dropwise and the reaction mix refluxed for two hours at which time an additional 0.6 gram benzoyl peroxide was added and the reaction mix refluxed for 18½ hours more. The volatiles were removed from the reaction product by milling on differential rolls at 160° C. Yield was about 300 grams. The product contained less than 1% vinyl acetate homopolymer as determined by boiling in dimethyl formamide for three hours and about 15% total content of polymerized vinyl acetate as determined by infrared analysis. Allowing for the 1% content of polymerized vinyl acetate homopolymer, there was accordingly 14% by weight of vinyl acetate combined as a graft copolymer with polyethylene. The material was clearer than the original polyethylene used in the reaction and showed only a slight tendency to neckdown and blush when elongated. Tensile and flexural bars were injection molded from the product under the following conditions: Cylinder temperature 340° F., mold temperature 150 F., hydraulic pressure 12,000 p.s.i, injection time ¼ minute, holding time ¾ minute.

The same conditions were used to mold test bars of polyethylene and also to mold a mechanical mixture of 14% polyvinyl acetate and 86% polyethylene. This mechanical mixture was prepared by milling the two materials together on differential rolls at 160° C. for 10 minutes.

Table II supra lists the properties of the bars prepared from the product of this example along with the bars prepared from polyethylene and from the mechanical mixture.

EXAMPLE 7

(A) Two hundred eighty grams polyethylene (12,000 M.W.) were dissolved in 1500 grams boiling benzene and 0.4 gram benzoyl peroxide was added; 120 grams vinyl acetate were then added dropwise over a ½ hour period and the reaction mix refluxed for 3 hours whereupon an additional 0.4 gram benzoyl peroxide was added. At the end of another three hours of refluxing another 0.4 gram of catalyst was added and refluxing continued for sixteen hours. Four hundred grams of the benzene were distilled off and the remaining benzene and unreacted monomer were removed by milling the reaction product on differential rolls at a temperature of 160° C. An infrared analysis of the volatile free product indicated a total content of 13.9% by weight of polymerized vinyl acetate in the form of homopolymer and as graft copolymer. Since total extractibles by boiling dimethyl formamide were 1.24%; therefore by difference 12.66% by weight of the polymerized vinyl acetate was chemically combined with polyethylene as a graft copolymer.

(B) Fifty grams of the volatile free extraction product from (A) were dissolved in 360 grams boiling benzene. To this solution an alcoholic solution of 3.5 grams sodium hydroxide in 90 grams methanol were added dropwise over a forty minute period. The mix was allowed to reflux one hour and then 40 cc. of glacial acetate acid were added to neutralize any excess base. The solids were filtered off, washed with water and again filtered. The pH of the filtrate was 5–6. Forty-three grams of a powdery white material were obtained after overnight drying in vacuo at 60° C. On the basis of total polymerized vinyl acetate content of the reaction product from (A) the polyvinyl alcohol content of the reaction product obtained in (B) should be 7.12%; 7.18% was found by acetylation. An infrared absorption spectrum showed the absence of carbonyl absorption and the presence of a high concentration of hydroxyl, indicating the complete absence of all acetate groups and presence of a significant amount of vinyl alcohol groups.

(C) Five grams of the reaction product obtained in (B) were extracted for 94 hours with benzene. 1.85 grams or 35% was insoluble. By infrared analysis the extracted portion was pure ethylene homopolymer.

EXAMPLE 8

(A) Two hundred eighty grams polyethylene (M.W. 21,000) were dissolved in 1680 grams of benzene under reflux. 0.6 gram (0.5% on monomer) benzoyl peroxide was added followed by the dropwise addition of 120 grams vinyl acetate during twenty minutes in an atmosphere of nitrogen. After 23.5 hours under reflux an additional 1.0% quantity (on monomer) of catalyst was added. After a total of 31 hours under reflux the gross reaction product was freed from volatiles and analyzed. Total polymerized vinyl acetate as homopolymer and graft copolymer (by infrared determination) was 14.1%; polyvinyl acetate homopolymer (by extraction with dimethyl formamide) was 1.9%. Yield was 326 grams representing a monomer conversion of 38%.

(B) One hundred grams of the reaction product from (A) were dissolved in 700 grams benzene. To the solution 7.7 grams sodium hydroxide in 200 grams methanol were added over 1¾ hours. In the early stages the viscosity of the mix increased to the point where agitation could barely be maintained. Later the system became more fluid. The reaction proceeded with yellowing and the precipitation of amorphous solids. After the addition of alcoholic sodium hydroxide, an hour of reflux was allowed before 10 cc. acetic acid were added to neutralize any excess base. The solids were filtered off, washed thoroughly and were then dried overnight at 60° C. under vacuum. The yield, including 6 grams adhering to the reaction flask walls, was 94 grams of a tan powder. Theoretical yield was 93.1 grams. An infrared spectrum analysis indicated 100% conversion of the grafted polyvinyl acetate to grafted polyvinyl alcohol chains.

(C) Five grams of the reaction product from (B) were extracted with toluene for 120 hours. 53% of the product was extractible and by infrared analysis the extracted product was found to be pure polyethylene.

The results of the analyses in Example 7 (A) and (B) and Example 8 (A) and (B) are given in the following table.

| Example | Composition of Reaction Products | | | | | |
|---|---|---|---|---|---|---|
| | Percent Homopolymers | | | Percent Graft Co-polymer | Vinyl Acetate: Ethylene | Vinyl Alcohol: Ethylene |
| | Vinyl Acetate | Vinyl Alcohol | Ethylene | | | |
| 7(A) | 1.2 | | 57 | 41.8 | 32/68 | |
| 7(B) | | 0.66 | 63 | 36.3 | | 19.5/90.5 |
| 8(A) | 1.9 | | 49 | 49.1 | 25/75 | |
| 8(B) | | 1.0 | 53 | 46.0 | | 16.5/83.5 |

EXAMPLE 9

Sixty grams of polyethylene (M.W. 21,000) were dissolved in 360 grams benzene and 0.133 gram benzoyl peroxide and 40 grams of vinyl acetate added. The reaction mixture was refluxed (79° C.) for a period of three hours and a second portion of 0.133 gram benzoyl peroxide added. The reaction was continued for another three hours when a third portion of 0.133 gram catalyst was added and then the reaction mixture was refluxed for another 12 hours. At the end of that time 34.5 grams of a polymeric product (A) deposited on the walls of the flask. Forty grams of a polymeric product (B) remained in solution. Ten grams each of (A) and (B) were extracted at 153° C. with dimethyl formamide to remove vinyl acetate homopolymer.

| Fraction | Percent Polyvinyl Acetate Homopolymer | Percent Grafted Polyvinyl Acetate |
|---|---|---|
| Polymer (A) | 2.5 | 9.75 |
| Polymer (B) | 14.5 | 11.1 |

Both products (A) and (B) were thermoplastic.

EXAMPLE 10

Two hundred eighty-five grams polyethylene grease (M.W. 1000–3000) were dissolved in 1710 grams of benzene and 1.22 grams benzoyl peroxide added. One hundred twenty-two grams of vinyl acetate were added dropwise to the refluxing benzene solution of grease and catalyst in a nitrogen atmosphere. The reaction was continued for 27 hours at the temperature of the refluxing system and then the reaction mixture was filtered hot. The volatiles were then stripped off first at atmospheric pressure and finally under reduced pressure (20–50 mm. Hg). Yield was 352 grams of a waxy solid which was harder and stiffer than the original polyethylene. The total polymerized vinyl acetate content by infrared was 15.4% and since the grafting efficiency was 100% as determined by heptane extraction, the vinyl acetate was therefore all combined with polyethylene as graft copolymer.

EXAMPLE 11

Two hundred eight-five grams polyethylene (M.W. 1000–3000) were dissolved in 570 grams of benzene and 1.22 grams benzoyl peroxide added. One hundred twenty-two grams of vinyl acetate were added dropwise and the reaction carried out in a manner similar to that described in Example 10. The hot reaction mixture was not filtered before stripping of the volatiles. The yield was 338 grams of a waxy solid stiffer than the polyethylene used. The reaction product contained 18.1% chemically combined vinyl acetate, the grafting efficiency being 100% as determined by extraction with n-heptane.

EXAMPLE 12

Fifty-six grams polyethylene grease (M.W. 1000–3000) were dissolved in 100 grams benzene and 0.28 gram benzoyl peroxide added; 56 grams of vinyl acetate were added dropwise and the mixture refluxed for 21 hours and then devolatilized. The reaction product was crumbly and soft. Total polymerized vinyl acetate content as homopolymer and in graft copolymer was found by infrared to be 41.6% of the reaction product, equivalent to 71% conversion of the monomer. After one hour extraction with acetone to remove polyvinyl acetate homopolymer, centrifuging the resulting mixture, collecting and drying the solids, the grafted vinyl acetate content of the solids was 20.5%. The grafting efficiency was 37% as determined by the acetone extraction.

EXAMPLE 13

Eight hundred grams of a gross reaction product of polyethylene and vinyl acetate containing about 17% by weight of grafted vinyl acetate was dissolved in 6000 grams of benzene under reflux in a five-gallon stainless steel still equipped with agitator. The mixture was cooled to 60° C.–70° C. and a solution of 109 grams potassium hydroxide in 1500 grams methanol was slowly added and a thick solid mass precipitated. This was neutralized with 100 grams glacial acetic acid and then filtered; the precipitate was washed with water and vacuum dried at 60° C. Yield was 728 grams of a thermoplastic powder which was molded into bars and pressed into films having good mechanical properties. These films can be laminated to aluminum foil or cellophane, excellent adhesion being obtained.

EXAMPLE 14

Twenty-nine grams vinyl butyrate monomer were mixed with 69 grams polyethylene (M.W. 1000–3000) at 100° C. to form a clear solution which was then reacted for 19 hours using 1% benzoyl peroxide (on monomer) as catalyst. After the addition of the benzoyl peroxide at 104° C. the temperature was increased to 135° C. and held at 134° C.–145° C. for the remainder of the reaction period. Unreacted monomer was then stripped off under reduced pressure (20 mm. Hg) yielding 90 grams of gross reaction product. This represents a 76% conversion of the monomer and a total polymerized vinyl butyrate content as homopolymer and as combined in graft copolymer of 24.5%. The reaction product was extracted for 66 hours with hot isopropanol (a solvent for polyvinyl butyrate homopolymer) resulting in a weight loss of 28.6%. The isopropanol insoluble residue still contained a 23.6% content of polymerized vinyl butyrate by infrared analysis. By weight balance, the composition of the isopropanol soluble portion was 26.9% polymerized vinyl butyrate, indicating that mostly graft copolymer and not polyvinyl butyrate was extracted. The grafting efficiency in the copolymer could not be determined exactly but it was indicated as being in excess of 90%.

EXAMPLE 15

A clear solution was formed by mixing at 90° C. 30 grams of vinyl 2-ethyl hexoate and 70 grams polyethylene (M.W. 1000–3000), to which was added 1% by weight (on monomer) of benzoyl peroxide as initiating catalyst. The mixture was then held at 135± 2° C. for 23 hours to cause reaction. Unreacted monomer was then removed under reduced pressure (20 mm. Hg) yielding a gross reaction product calculated to contain a total content of polymerized vinyl octoate as homopolymer and as combined in graft copolymer amounting to 21.3% and a monomer conversion of 63%. The product was extracted with isopropanol resulting in a weight loss of 8.2%. The insoluble residue still contained 21.1% content of polymerized vinyl octoate by infrared analysis. By weight balance the composition of the isopropanol soluble portion was 23.5% polymerized vinyl octoate, indicating that mostly graft copolymer was being extracted rather than polyvinyl octoate homopolymer. This indicated a grafting efficiency of about 90%.

EXAMPLE 16

8.7 grams vinylene carbonate monomer were heated with 21.2 grams polyethylene (1000–3000 M.W.) and 0.09 gram benzoyl peroxide for 25 hours at 135° C.-145° C. in a nitrogen atmosphere a clear solution forming on initiation of heating. Unreacted monomer was then removed under reduced pressure. The residue weighing 24.7 grams was a dark brown resinous material somewhat stiffer than the polyethylene used in the reaction. The total content of polymerized vinylene carbonate as homopolymer and in graft copolymer in the residue was determined as 14.2%. Extraction of this product with benzene (in which polyvinylene carbonate homopolymer is insoluble) yielded an insoluble residue constituting about 11.2% of the product. An infrared spectrum of the soluble portion showed the presence of polyvinylene carbonate verifying grafting to the polyethylene.

The composition of the benzene soluble portion was determined as being:

| | Percent |
|---|---|
| Grafted vinylene carbonate | 3.4 |
| Polyethylene | 96.6 |

The grafting efficiency was 21%.

EXAMPLE 17

Thirty-five grams vinyl propionate dissolved in 144 grams benzene were reacted with 72 grams polyethylene (1000–3000 M.W.) in the presence of 0.35 gram benzoyl peroxide for 20 hours at reflux temperature. An additional 0.35 gram of benzoyl peroxide was added followed by another 5½ hours of reflux. The volatiles were removed by distillation at atmospheric pressure and finally under reduced pressure. The residue product weighed 95.5 grams representing a 56% conversion of monomer, and 24.6% content of polymerized vinyl propionate in the polymer. An infrared spectrum of the material showed the absence of unreacted monomer. Extraction of the residue with methanol and then with isopropanol, which are solvents for polyvinyl propionate homopolymer, gave a weight loss of 14.3%. The insoluble residue after extraction had a 13.2% content of polymerized vinyl propionate by infrared determination. By weight balance the composition of the soluble portion was 93% polyvinyl propionate indicating a grafting efficiency of about 50%.

What is claimed is:

1. The process which consists in reacting in the presence of a catalyst selected from the group consisting of benzoyl peroxide, hydroxyheptyl peroxide, methylethyl ketone peroxide, cyclohexanone peroxide, cumene hydroperoxide, tert-butyl hydroperoxide, p-chlorobenzoyl peroxide, di-tert-butyl peroxide, peracetic acid, di-tert-butyl diperphthalate, a preformed normally solid polyethylene and a vinyl ester of a carboxylic acid, said polyethylene being dissolved in an aromatic solvent therefor, to form a homogeneous mixture comprising ethylene homopolymer, a homopolymer of the vinyl ester, and a graft copolymer of polyethylene and the vinyl ester, and thereafter removing said aromatic solvent.

2. The process according to claim 1 which includes the further step of separating the vinyl ester homopolymer from the homogeneous mixture.

3. The process according to claim 1 in which the vinyl ester of a carboxylic acid is vinyl acetate.

4. The process according to claim 1 in which the vinyl ester of a carboxylic acid is vinyl propionate.

5. The process according to claim 1 in which the vinyl ester of a carboxylic acid is vinyl butyrate.

6. The process according to claim 1 in which the vinyl ester of a carboxylic acid is vinyl octoate.

7. As a new composition of matter, the homogeneous composition consisting of homopolymeric ethylene, homopolymeric vinyl ester and thermoplastic graft copolymer, said composition produced by the process of claim 1, said graft copolymer being further characterized as being composed of homopolymeric ethylene having chemically bonded thereto side chains consisting of homopolymeric vinyl ester of a carboxylic acid.

References Cited in the file of this patent

UNITED STATES PATENTS

| | | |
|---|---|---|
| 2,175,672 | Scott et al. | Oct. 10, 1939 |
| 2,282,002 | Scott et al. | May 5, 1942 |
| 2,405,817 | D'Alelio | Aug. 13, 1946 |
| 2,497,323 | Roedel | Feb. 14, 1950 |
| 2,520,959 | Powers | Sept. 5, 1950 |
| 2,542,771 | Hanford et al. | Feb. 20, 1951 |
| 2,609,353 | Rubens et al. | Sept. 2, 1952 |
| 2,610,962 | Smyers et al. | Sept. 16, 1952 |
| 2,620,324 | Coover et al. | Dec. 2, 1952 |
| 2,837,496 | Vandenberg | June 3, 1958 |

FOREIGN PATENTS

| | | |
|---|---|---|
| 499,578 | Canada | Jan. 26, 1954 |

OTHER REFERENCES

Bawn: "The Chemistry of High Polymers," page 20, Interscience Publ., Inc., New York (1948).

"Journal of Polymer Science," volume VIII, pages 257–277, particularly page 260 (1952).

"Journal of Polymer Science," volume 8, Jan.-June 1952, page 260, Interscience Publishers Inc.